(12) United States Patent
Horton et al.

(10) Patent No.: US 7,505,171 B2
(45) Date of Patent: Mar. 17, 2009

(54) FULL USER-INTENT COLOR DATA STREAM IMAGING METHODS AND SYSTEMS

(75) Inventors: Thomas E. Horton, Torrance, CA (US); Mark A. Gaines, Hawthorne, CA (US); Steven F. Livengood, Laguna Niguel, CA (US); Robert R. Laman, Rancho Palos Verdes, CA (US)

(73) Assignee: Xerox Corporation, Norwalk, CT (US)

( * ) Notice: Subject to any disclaimer, the term of this patent is extended or adjusted under 35 U.S.C. 154(b) by 1035 days.

(21) Appl. No.: 10/648,968

(22) Filed: Aug. 27, 2003

(65) Prior Publication Data
US 2005/0050465 A1    Mar. 3, 2005

(51) Int. Cl.
*G06F 17/00*    (2006.01)

(52) U.S. Cl. .................... 358/1.9; 358/518; 358/540; 358/1.13; 358/1.15; 358/464

(58) Field of Classification Search ........... None
See application file for complete search history.

(56) References Cited

U.S. PATENT DOCUMENTS

| | | | | |
|---|---|---|---|---|
| 5,134,493 A | | 7/1992 | Laman et al. ............ 358/296 |
| 5,153,739 A | * | 10/1992 | Laman et al. ............ 358/300 |
| 5,237,517 A | * | 8/1993 | Harrington et al. ....... 382/162 |
| 5,471,324 A | * | 11/1995 | Rolleston ................ 358/518 |
| 5,550,569 A | | 8/1996 | Wright |
| 5,588,093 A | * | 12/1996 | Harrington ............... 358/1.9 |
| 5,880,738 A | * | 3/1999 | Donelly ................... 345/604 |
| 6,115,493 A | * | 9/2000 | Harrington ............... 382/162 |
| 6,426,802 B1 | * | 7/2002 | Lin ......................... 358/1.9 |
| 6,535,209 B1 | * | 3/2003 | Abdalla et al. ........... 345/418 |
| 6,594,388 B1 | * | 7/2003 | Gindele et al. ........... 382/167 |

FOREIGN PATENT DOCUMENTS

EP    0570146 A1    11/1993
WO    WO 00/77723 A1    12/2000

OTHER PUBLICATIONS

European Search Report dated Aug. 14, 2008 for Application No. 04020334.1.

* cited by examiner

*Primary Examiner*—Twyler L Haskins
*Assistant Examiner*—Pawandeep S Dhingra
(74) *Attorney, Agent, or Firm*—Kernit D. Lopez; Luis M. Ortiz; Ortiz & Lopez, PLLC

(57) ABSTRACT

Methods and systems in a printer output device for improving color-imaging rendering utilizing an imaging data stream are disclosed herein. An imaging order is generally associated with the imaging data stream for a plurality of images and overlapping objects to be rendered. The imaging data stream can be designated, such that the imaging order determines color quality rendering thereof. The generated by the printer output device can be rendered utilizing the imaging data stream according to a pre-determined ink color. Imaging separations can also be generated utilizing the imaging data stream, wherein the imaging separations are based on an actual specified color for rendering thereof via the printer output device.

16 Claims, 6 Drawing Sheets

/- 200

| IOT | Imaging Technology | | |
|---|---|---|---|
| | LPS | CLCDS (Pictorial Highlight Mapping Algorithm) | CLCDS (Color to Highlight Mapping Algorithm) |
| B/W | PINK Text | PINK Text | PINK Text |
| HLC (Red Toner) | PINK Text | PINK Text | PINK Text |
| HLC (Blue Toner) | PINK Text | PINK Text | PINK Text |
| Full Color | N/A | PINK Text | PINK Text |

| IOT | Imaging Technology | | |
|---|---|---|---|
| | LPS | CLCDS (Pictorial Highlight Mapping Algorithm) | CLCDS (Color to Highlight Mapping Algorithm) |
| B/W | PINK Text | PINK Text | PINK Text |
| HLC (Red Toner) | PINK Text | PINK Text | PINK Text |
| HLC (Blue Toner) | PINK Text | PINK Text | PINK Text |
| Full Color | N/A | PINK Text | PINK Text |

*FIG. 2*

FULL USER-INTENT COLOR DATA STREAM IMAGING METHODS AND SYSTEMS

TECHNICAL FIELD

Embodiments are generally related to printing methods and systems. Embodiments are also related to imaging data streams and color imaging models thereof. Embodiments are additionally related to data streams for imaging via document rendering systems.

BACKGROUND OF THE INVENTION

Digital printing systems generally are constructed from two essential components. The first component is a print engine and the second component is a print controller. The print engine and controller units can be developed and implemented independently of one another, or integrated into the product that is ultimately manufactured. In general, the print controller handles communications and interfaces with a host system.

A print controller can also interpret print commands transmitted from the host and translate them into signals required to drive the print engine. Printing functions ranging from color management to duplexing generally depend on the interaction of the print engine and the controller. Digital print systems include, for example, desktop units, copy machines, printers, print-on-demand systems, and so forth.

One of the functions of a print controller is the ability to effectively enable a print stream format. A number of different print stream formats are utilized in the printing arts. A commonly utilized print stream format (also referred to herein as an "imaging data stream") is the Line Conditioned Data Stream (LCDS), developed by Xerox Corporation of Stamford, Connecticut. LCDS is one type of an imaging data stream that can be utilized to drive, for example production printers and host systems. Unlike page description languages, which create pages from high-level graphical constructs, print command languages such as LCDS contain printer commands interspersed with data and are processed and executed sequentially.

Currently, LCDS imaging models involve monochrome and highlight color. A proprietary digital printing system, for example, for which LCDS was introduced, can define the language that is executable on LPS (Laser Printing System) products. On such products and any true emulations thereof, any specification of a color that utilizes more than one non-monochrome color typically results in error messages displayed to the user of LCDS products, and the request is only rendered using the monochrome ink. No attempt is made to best approximate the intent of the user in the color printing process.

A need therefore exists for improving the color quality output of the LCDS imaging data streams. Such a goal can be accomplished through the application of a unique imaging model, which is disclosed in further detail herein with respect to particular embodiments.

BRIEF SUMMARY

It is a feature of the present invention to provide improved printing methods and systems.

It is also a feature of the present invention to provide an improved imaging data stream and color-imaging model thereof.

It is a further feature of the present invention to provide improved lined conditioned data stream (LCDS) methods and systems.

Aspects of the present invention relate to methods and systems in a printer output device for improving color-imaging rendering utilizing an imaging data stream. An imaging order is generally associated with an imaging data stream language for a plurality of images to be rendered. The imaging data stream (e.g., LCDS) can be designated, such that the imaging order determines color quality rendering. The output generated by the output device (e.g., whether printed or visual display or other) can be rendered utilizing the imaging data stream according to a pre-determined ink color.

Imaging separations can also be generated utilizing the imaging data stream, wherein the imaging separations are based on an actual specified color for rendering thereof via the printer output device. The imaging order can be applied to overlapping objects that are considered earlier in the imaging order sequence, and prior to later objects. Objects later in the sequence which overlap objects earlier in the sequence may, in some instances, obscure the portion of the earlier object in the area of the overlap.

In accordance with an embodiment, an imaging sequence can be implemented generally as follows: (1) all fills are called out in an LCDS Form Resource; (2) all image data is called out in an LCDS Form Resource; (3) form text and logos data are called out in an LCDS Form Resource; (4) all image data is called out in the order they appear from a variable data portion of an LCDS data stream; and (5) a plurality of logos referenced from variable data of the imaging data stream; (6) variable data (e.g., text) is called out in the order encountered within the data stream; and (7) DJDE (Dynamic Job Descriptor Entry) boxes and rules are imaged according to their image order.

Note that the imaging data stream described herein can provide, in accordance with embodiments, a line-conditioned data stream (LCDS), with or without color enhancements. Embodiments thereof can permit a full color-imaging model to be applied to an imaging data stream for an enhanced approximation of a user-intent point of view.

BRIEF DESCRIPTION OF THE DRAWINGS

The particular values and configurations discussed in these non-limiting examples can be varied and are cited merely to illustrate one or more embodiments and are not intended to limit the scope thereof.

FIG. 2 illustrates a table illustrating text rendering, in accordance with an embodiment;

DETAILED DESCRIPTION OF THE INVENTION

The particular values and configurations discussed in these non-limiting examples can be varied and are cited merely to illustrate embodiments and are not intended to limit the scope of the invention.

Figure 1:
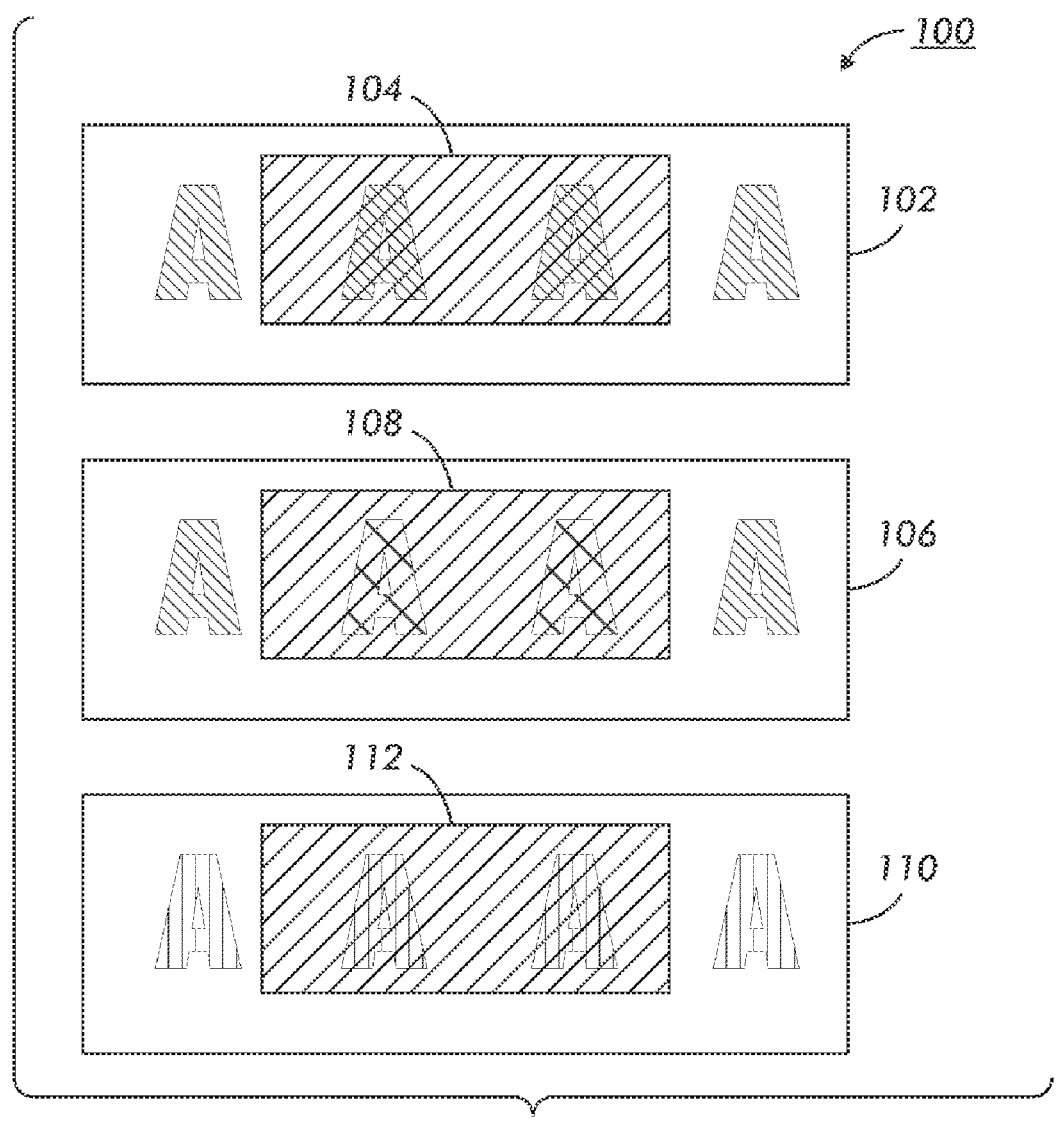
FIG. 1 illustrates a block diagram comparing output rendering from an LPS system with LCDS versus an improved imaging model applied to the LCDS imaging data stream, in accordance with an embodiment.

FIG. 1 illustrates a block diagram 100 comparing output rendering from an LPS system with LCDS versus an improved imaging model applied to an LCDS imaging data stream, in accordance with an embodiment. In general, embodiments are directed toward methods and systems utilized in printer output devices (e.g., photocopy devices, laser printers, etc.) for improving color-imaging rendering through an imaging data stream. Note that in FIGS. 1-5 herein, shaded or hatched areas generally represent color. Thus, in FIG. 1 varying colors are represented by varying hatched or shaded lines. Such hatched and/or shaded areas can represent, for example, pink, red or a variety of colors, depending upon particular embodiments thereof. Further, such colors can also represent various color tints, such as, for example, a light pink, a dark pink, a light red, a dark red, and the like.

In order to adequately explain an embodiment, comparisons can be made between an LPS printing system's interpretation of LCDS and an interpretation of LCDS in a Full User Intended Color Fashion (i.e., or CLCDS systems). In a conventional LPS system's interpretation of LCDS, black and highlight data are, conceptually, imaged into two distinct separations. Due to the use of tri-level Xerography, a given pixel, could be printed as either black or a highlight color, but not both. When both separations indicated that a pixel is to be printed, the result is determined by the value of the job's ink result specification (BLACK or COLOR), if present, or the system default value, if not.

The ink result concept is not well suited for a color-imaging model because, for example, more than two choices for the color of a pixel are present. Therefore, CLCDS will not make use of an ink result. The CLCDS imaging model is based on an imaging order. The last object processed at a particular place on the page is generally imaged last and completely covers what came before (i.e. what is "underneath" it). This behavior is not applied on a pixel-by-pixel basis like ink result. It is, however, applied to the entire object being imaged.

For example, in LPS systems, if pink text is printed over a gray form fill 104 and ink result were BLACK, the output would appear similar to that provided at block 102 of FIG. 1. The text would be fully saturated red (the predominant primary of pink), but in the filled area 102 the red pixels of the text would show through the blank pixels of the fill. So, the text would have a dark red appearance. If the ink result were COLOR, the output would appear similar to that provided by block 106, including filled area 108. The text in the filled area would be fully saturated red in both the filled and non-filled areas. In CLCDS systems, the results would appear similar to that of block 110, including filled area 112. In an LPS system, users had no control over the order in which objects were imaged and none was needed since the resulting appearance was independent of order.

In CLCDS systems, however, the results depend on the imaging order, so an order must be imposed. CLCDS will image objects on a page in the following order:
1. Form fills
2. Form images
3. Form text and logos in the order in which they appear in the form definition.
4. Variable-data specified images
5. Logos
6. Variable data (e.g., text) in the order encountered within the data stream.
7. DJDE boxes and rules are imaged according their image order parameter.

Note that the acronym "DJDE" as utilized herein generally refers to a Dynamic Job Descriptor Entry. DJDEs are LCDS commands embedded within the input data stream. The imaging order can thus be applied to overlapping objects that are considered earlier in the imaging order sequence, and prior to later objects. Objects later in the sequence which overlap objects earlier in the sequence may, in some instances, obscure the portion of the earlier object in the area of the overlap.

The imaging sequence can therefore be implemented generally as follows: (a) all fills are called out in an LCDS Form Resource; (b) all image data is called out in an LCDS Form Resource; (c) text and logo data are called out in an LCDS Form Resource; (d) all image data are called out in the order they appear from a variable data portion of an LCDS data stream; and (e) a plurality of logos referenced from variable data of the imaging data stream.

Note that the term "called out" or "calling out" as utilized herein generally refers to data referenced by the imaging data stream. The term "fill" generally refers to a region which can be imaged with a defined ink pattern (i.e., uniform or solid). A "form resource" or resource generally refers to a resource that is external (e.g., resident on a printer) or embedded (e.g., downloaded fashion within a job) in the imaging data stream. A form can be implemented as a specific type of resource within LCDS, and can be a compiled file and/or containing specific arrangement of lines, text, and graphics stored electronically.

Color support for text does not require any changes to the LCDS language. A named ink specifies the color of text. The supported ink names and their corresponding appearance are contained in an LCDS ink catalog resource. CLCDS has changed an ink definition from a highlight color/black mixture to an sRGB specification.

In LPS systems, text can only be rendered as either 100% black or 100% highlight even if the ink specified was a combination of the two (i.e., a mixture). On a highlight color Imaging Output Terminal (IOT), the text is generally rendered in the predominant primary (i.e., toner) of the requested ink. Note that the acronym IOT generally refers to the marking engine, or printer hardware. An Imaging Output Terminal (IOT) can be implemented as the physical unit that moves paper, deposits ink and delivers paper to an output tray. Thus, the text colored by an ink defined to be 35% black, 25% highlight and 40% white can be rendered as 100% black. On a black and white output device, text is generally always rendered as black.

CLCDS renders text as closely as it can to the color specified by the ink. On a B/W IOT, CLCDS will print the text in a gray of equivalent luminance to the ink's color. On a Highlight Color (HLC) IOT, CLCDS can render the text according to the color-to-highlight-color translation rules associated with the job (typically defaulted from a queue or a system setting). Note that HLC (i.e., "Highlight Color") generally refers to a printer capable of printing with two colorants (e.g., black and one other colorant). HLC allows for a range of colors, tints and shades to be printed by varying the percentage of black dots, colored dots, and the white space between the dots.

FIG. 2 illustrates a table 200 illustrating text rendering, in accordance with an embodiment. Table 200 generally illustrates how text colored with an ink specified to be 50% red and 50% "white" (i.e. pink) would appear on three different types of IOTs using the LPS, the standard LCDS color model and the CLCDS color model.

Requesting pink text in an LPS LCDS data stream is an example of a non-conforming job. The term "non-conforming" as utilized herein generally refers to results which are not accurate. LPS systems that utilize standard LCDS, for example, are unable to render text other than 100% black or 100% of the physically loaded other toner pigment. Further, the appearance of a defined ink pattern printed on a HLC LPS print engine when driven by CLCDS will be similar, but not identical, to the appearance of the ink when printed on the LPS HLC system using the LCDS model.

Due to the increased flexibility provided by improved CLCDS methods and systems described herein, catalogs that describe former LPS HLC inks using a Standardized RGB (sRGB) notation can allow the printed results to be close and virtually indiscernible to the legacy 53 lpi (lines per inch) printed results. Note that RGB refers to a color gamut specification, and sRGB refers generally to a standardized embodiment. Also, the term "lpi" (lines per inch) generally refers to a defined resolution utilized with conventional LCDS techniques. 53 lpi is a commonly used halftone screen frequency for printing at a resolution of 300 spi. The halftone screen frequencies are tuned to provide the best graphics, and therefore may not be precisely the same as the LPS highlight color screen frequencies using the LCDS model.

An LPS device or system that utilizes LCDS generally allows only one highlight color on a page. If more than one is requested, the controller generates a warning message that the job has "Exceeded ink capability of the printer". The job could be printed substituting black for all highlight toners other than the first (i.e., highlight color printers), or substituting black for all highlight toners (i.e., monochrome printers). In a CLCDS system, there is no limit to the number of colors allowed on a page. Any previous restrictions applied by limitations of the LPS Systems using LCDS are therefore relaxed and not applicable in this definition of the language.

LPS image support can be applied to monochrome and highlight color image (IMG) graphics. Note that the acronym IMG (i.e., image) can be utilized to refer to the Xerox Raster Encoding Standard. For monochrome images, the image can be treated as a mask to be imaged with black ink. Highlight color image files are treated as two masks to be imaged using inks specified in an image file or a graphic or image command. The "on" pixels can be colored with the appropriate ink and the off bits are considered to be transparent. If an IMG image is placed over another LCDS object, the object underneath may show through the transparent bits. For a highlight color image, this occurs once for the "black" plane and again for the highlight plane. If a pixel is off in both planes, that pixel will be transparent.

CLCDS implements the same behavior for IMG graphics as that of LPS devices or systems. In LPS systems that utilize LCDS, the ink used to image the separations can be specified as a mixture. These LPS systems using LCDS, however, do not utilize the halftone pattern associated with the ink to image the separation, the system uses the predominate primary. For example, if the inks specified for an HLC IMG graphic were dark-red (e.g., 30% black/70% red) and pink (e.g., 50% red/50% white), both separations would be imaged using fully saturated red toner.

Figure 3:
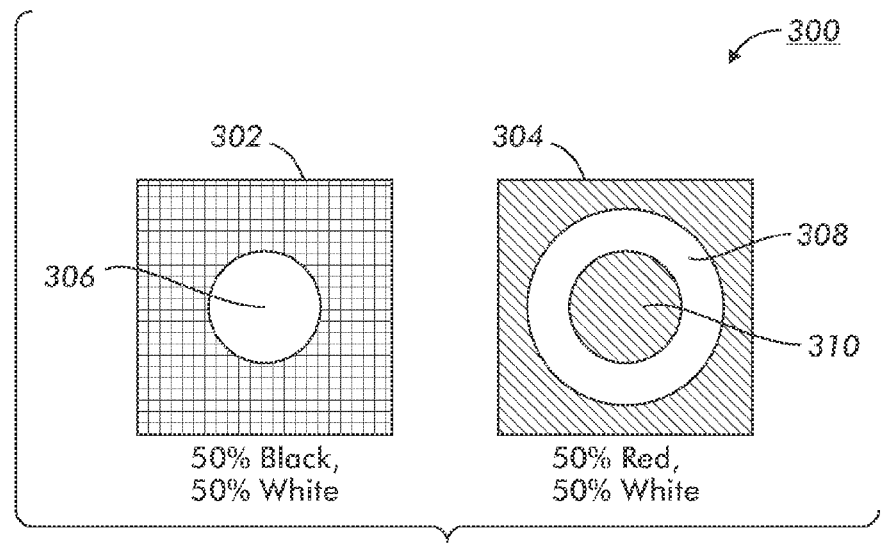
FIG. 3 illustrates image separation via an imaging data stream, in accordance with an embodiment.

CLCDS can image the separations using the actual color specified. FIG. 3 illustrates image separation via an imaging data stream, in accordance with an embodiment. For example, if the separations depicted in FIG. 3 were to be imaged utilizing the inks specified (consider the white area to be the "on" pixels), the features would appear similar to that outlined via block 300 contrasting a white area 306 versus a dark or black area 302 and a dark or black area 310 versus a white area 308.

Figure 4:
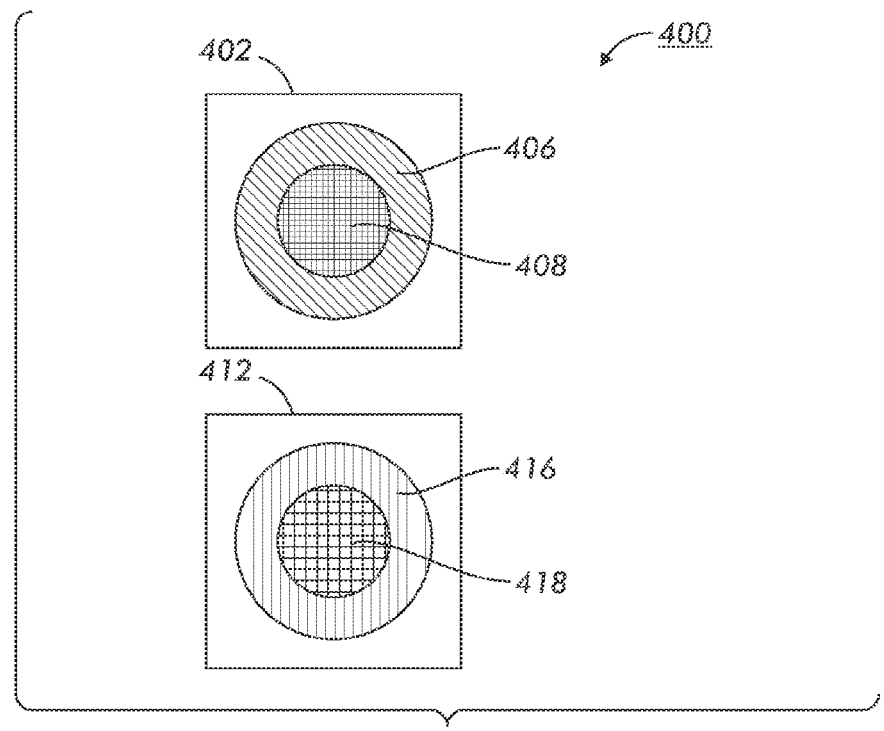
FIG. 4 illustrates output from an imaging data stream, in accordance with an embodiment.

FIG. 4 illustrates output from an imaging data stream, in accordance with an embodiment. Referring now to FIG. 4, a block diagram 400 is depicted, which indicates that on an LPS system with LCDS, the result would appear similar to that of block 402, including a darkened area 408 and a lighter red area 406. On a CLCDS system, however, the result would appear similar to that of block 412, including an orange area 416 and a darker, brown area 418.

The same pixel in the two separations of a highlight color image should not be "on". However, we know that this situation occurs. In LPS systems with LCDS, the appearance of the pixel that is "on" in both separations depends on the value of the ink result. CLCDS attempts to emulate this behavior for IMG format images. For an IMG with two separations, CLCDS will image the separation corresponding to the value of the ink result last if one of the inks is black (i.e., RGB=(0, 0, 0)). For example, if the ink result=BLACK and the inks associated with the separations are black and red (after applying any ink override), CLCDS will image the red separation first. If, after applying ink overrides, there is no black separation, CLCDS will image the separations in the order in which they are present in the IMG graphic.

In LCDS, logos are implemented as a font containing sequenced (tiled) bitmap data with built-in TL/DLs to control the sequencing and positioning of the bitmaps. For monochrome logos, the bitmap data is treated as a mask to be imaged with black ink. In a highlight color logo, the highlight color start and highlight color end meta-codes are used to define a second tiled bitmap separation. The highlight color logo format contains an ink list with one or two entries, corresponding to separations, which can be overridden by specifying an ink in the Print Description Language (a compiled portion of LCDS defined data streams) or LOGO command. Because logos are essentially custom fonts combined with information about how to place the characters of the font to produce the logo, they are treated as if they were text. This means that, in LPS systems with LCDS, the logo can be imaged utilizing the predominant primaries of the inks instead of the actual inks.

Just as with text and IMG images, CLCDS uses the specified full-color ink, not its predominant primary to image the separation. The same pixel in the two separations of a highlight color logo should not be "on". If this occurs in an LPS system with LCDS, the appearance of this pixel depends on the value of the ink result. Because a 3rd party software vender may have created the logos, the customer has no control over the order in which the separations appear in the logo file. If the appearance is objectionable, the customer must get a new logo created (perhaps as a TIFF or JPEG image).

Box fill and shading are LCDS operations that LPS systems with LCDS support only in forms. For both constructs, a rectangular area of the sheet is defined and then filled with an ink (fills) or shade of gray shading (light, medium or heavy). In LPS systems with LCDS, these effects are achieved using fonts with characters that are rectangular areas with the halftone pattern applied.

CLCDS behavior can be effectively identical. The actual screen frequency and halftone dots may be different, but the colors will be matched closely enough to achieve a similar printed effect. In LPS systems with LCDS, however, form text within a filled area would, generally, show through so the order of the fill and text is not important. For colored text on a gray background and black text on a colored background, the resulting appearance is controlled with the ink result command. In CLCDS systems, if the command for the background tint occurs after the command for the text, the opaque fill would result in it obscuring the text.

Figure 5:
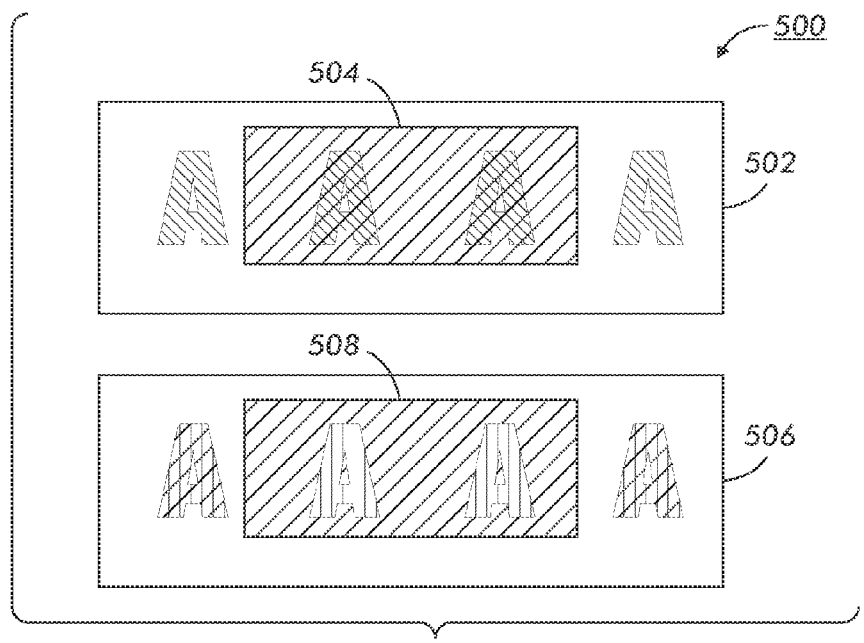
FIG. 5 illustrates output from an LPS system, including text and fill thereof, versus output from an improved imaging model applied to an imaging data stream, in accordance with an alternative embodiment.

FIG. 5 illustrates output from an LPS system with LCDS, including text and fill thereof, versus output from an improved imaging model applied to an imaging data stream, in accordance with an alternative embodiment. FIG. 5 depicts a block diagram 500, which includes blocks 502 and 506 and respective fills 504 and 508. On an LPS system with LCDS, the result would appear similar to that of block 502, while on a CLCDS system (i.e., in forms, text is imaged after fills), the result would appear similar to that of block 506.

Figure 6:
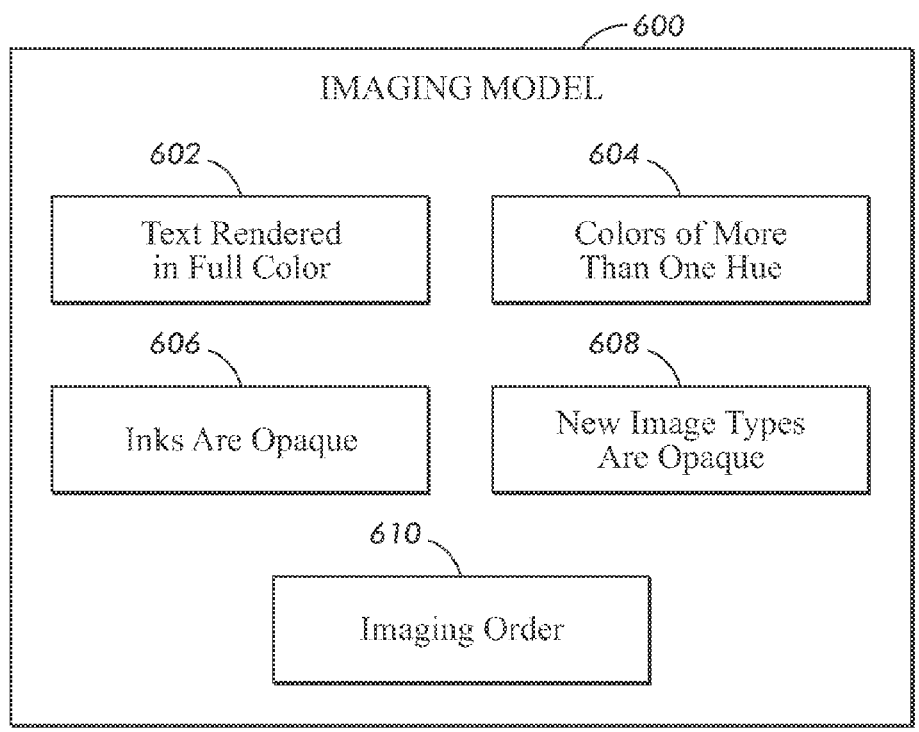
FIG. 6 illustrates a block diagram of an imaging model that can be implemented in accordance with an alternative embodiment.

FIG. 6 illustrates a block diagram of an imaging model 600 that can be implemented in accordance with an alternative embodiment. In general, the behavior of a conventional LPS imaging model with LCDS was heavily influenced by the capabilities of special purpose imaging hardware and the capabilities of tri-level xerography. CLCDS, on the other hand, can utilize a software imaging system that can support a more capable and modern imaging model. Imaging model 600 evidences such a system.

The imaging capabilities of such a model can include, as indicated at block 602, text in full color. Such text is not merely fully saturated black or highlighted. As depicted at block 604, colors of more than one hue can be imaged on a page. Thereafter, as described respectively at blocks 606 and 608, inks and new image types (e.g., TIFF, JPEG, PDF, etc.) can be opaque and the appearance of overlapping objects depends on the order in which they are imaged (i.e., the imaging order).

Because the CLCDS imaging model applies to full-color, highlight color, and monochrome systems, differences in output appearance can occur even when utilizing an existing LCDS data stream on a B/W or HLC IOT. CLCDS can produce compatible output for all conforming jobs. A job is generally conforming if the color specifications for all objects other than box fill are either 100% black or 100% highlight. This includes both inks specified in object headers and ink overrides.

A job can also be "conforming," if the job does not rely on the value of the ink result command (e.g., no overlapping objects of different colors). All jobs that are strictly monochrome are also considered to be conforming. Conforming jobs can possess identical appearance in CLCDS as they do on existing LPS systems with LCDS. The positioning of text, logos, and graphics can be identical. Small differences may be present due to interpolation from 300 to 600 spi.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

In accordance with an alternative embodiment, an imaging order module can configure the imaging order associated with an imaging data stream for a plurality of objects to be rendered. As indicated earlier, such an imaging order generally determines color quality rendering. Text generated by a printer output device can be transmitted through an imaging data stream according to a pre-determined ink color. Additionally, the imaging data stream can generate imaging separations based on an actual specified color for rendering via a printer output device.

Figure 7:
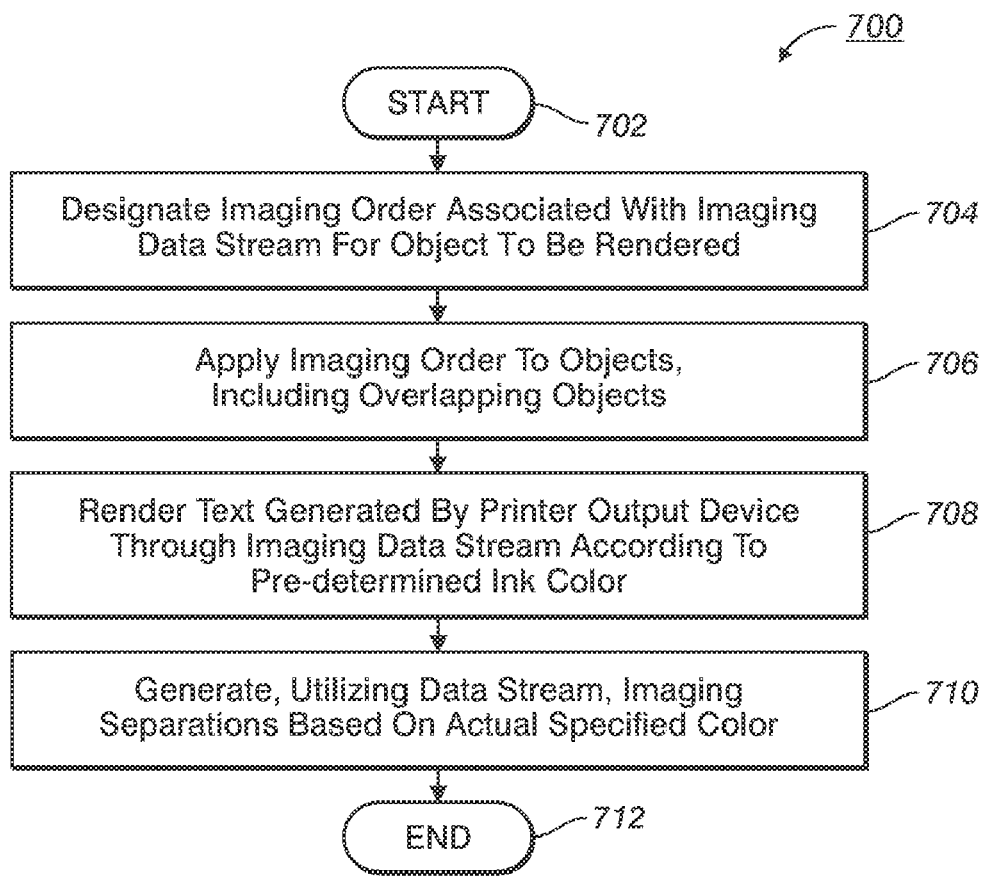
FIGS. 7-8 illustrate a high-level flow chart of operations outlining logical operational steps of a method 700, which can be implemented in accordance with the disclosed embodiments.
Figure 8:
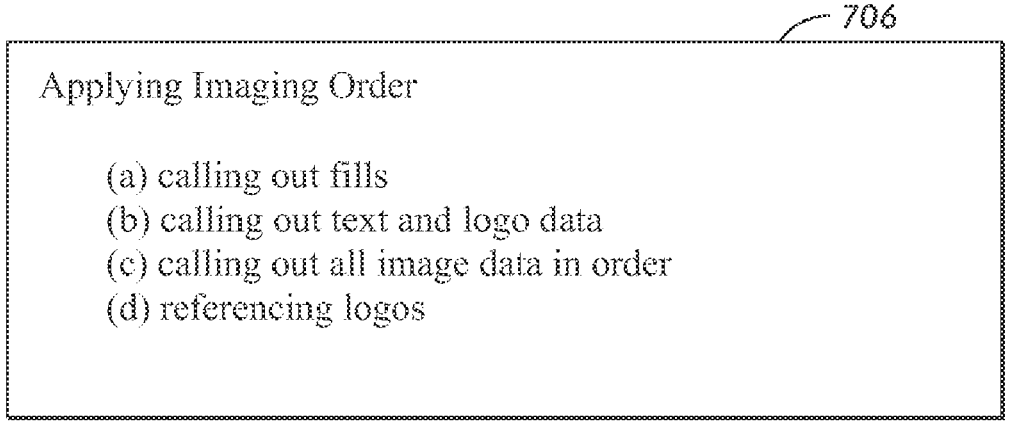

FIGS. 7-8 illustrate a high-level flow chart of operations outlining logical operational steps of a method 700, which can be implemented in accordance with the disclosed embodiments. Note that in FIGS. 7-8, identical parts or steps are generally indicated by identical reference numerals. As indicated at block 702, the process begins. Thereafter, as depicted at block 704, an operation can be processed for designating an imaging order associated with an imaging data stream for a plurality of objects to be rendered, wherein the imaging order determines color quality rendering. Next, as indicated at block 706, the imaging order can be applied to the objects, including overlapping objects thereof, wherein the imaging order comprises particular steps shown in FIG. 8 as follows: (a) calling out all fills in an imaging data stream form resource; (b) calling out text and logo data in an imaging data stream form resource; (c) calling out all image data in an order in which such data appear and are called out from a variable data portion of the imaging data stream; and (d) referencing a plurality of logos associated with the imaging data stream. Next, as illustrated at block 708, an operation can be implemented for rendering text generated by said printer output device through the imaging data stream according to a pre-determined ink color as described earlier herein. Thereafter, as depicted at block 710, an operation can be implemented for generating, utilizing said imaging data stream, imaging separations based on an actual specified color for rendering thereof via a printer output device. The process can then terminate as indicated at block 712.

Figure 9:
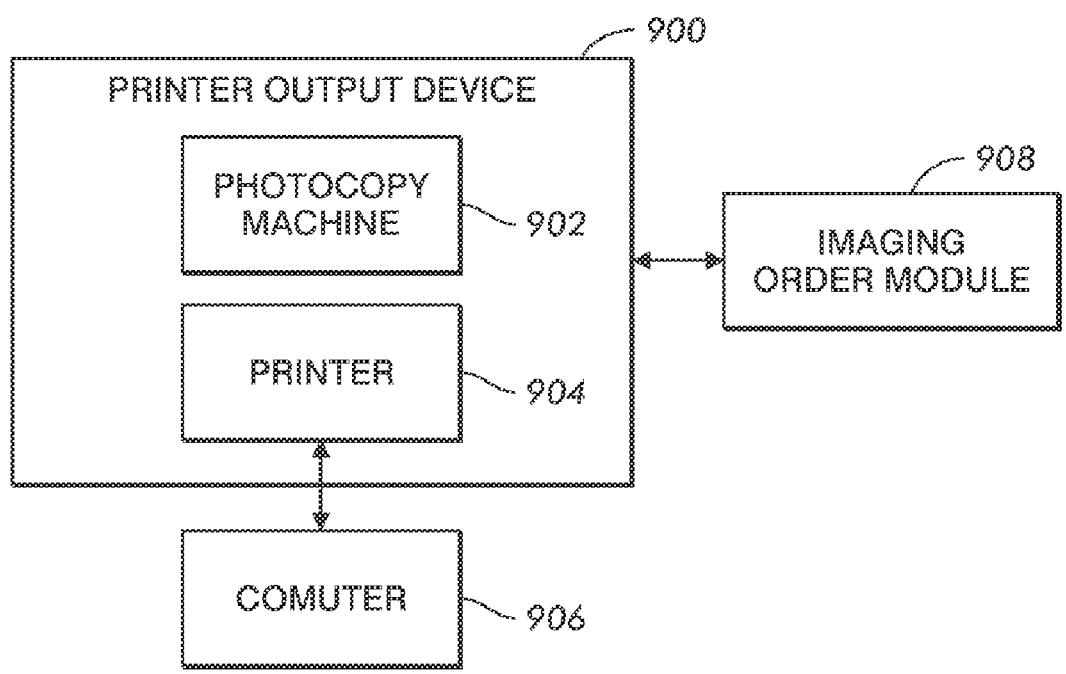
FIG. 9 illustrates a block diagram of a high-level system 900 that can be utilized to implement the process and/or system indicated in FIGS. 1-7.

FIG. 9 illustrates a block diagram of a high-level system 900 that can be utilized to implement the process and/or system indicated in FIGS. 1-7. System 900 generally includes a printer output device 900 which may be, for example, a photocopy machine and/or a printer 904 that can communicate with a computer. Additionally, an imaging order module can be provided for configuring an imaging order associated with the imaging data stream for objects to be rendered, wherein the imaging order determines color quality rendering as described earlier herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method, comprising:

designating an imaging order associated with a imaging data stream for a plurality of objects to be rendered, wherein said imaging order determines color quality rendering thereof;

applying said imaging order to said plurality of objects, including overlapping objects thereof, wherein said imaging order comprises:
  (a) calling out all fills in an imaging data stream form resource;
  (b) calling out text and logo data in an imaging data stream form resource;
  (c) calling out all image data in an order in which such data appear and are called out from a variable data portion of said imaging data stream; and
  (d) referencing a plurality of logos associated with said imaging data stream;
rendering text generated by said printer output device through said imaging data stream according to a pre-determined ink color; and
generating, utilizing said imaging data stream, imaging separations based on an actual specified color for rendering thereof via a printer output device.

2. The method of claim 1 further comprising applying a full color-imaging model to said imaging data stream to provide an enhanced approximation of a user-intent point of view.

3. The method of claim 1 further comprising:
rendering colors of more than one hue on at least a single page utilizing said imaging data stream.

4. The method of claim 1 wherein said printer output device comprises a photocopy machine.

5. The method of claim 1 wherein said printer output device comprises a printer, which can communicate with a computer.

6. A method, comprising:
designating an imaging order associated with an imaging data stream for a plurality objects to be rendered, wherein said imaging order determines color quality rendering thereof;
establishing said imaging order to apply to overlapping objects rendered on a page based on a sequence as follows:
  (a) calling out all fills in an imaging data stream form resource;
  (b) calling out text and logo data in an imaging data stream form resource;
  (c) calling out all image data in an order in which such data appear and are called out from a variable data portion of said imaging data stream; and
  (d); referencing a plurality of logos associated with said imaging data stream;
rendering text generated by said printer output device through imaging data stream according to a pre-determined ink color; and
generating, utilizing said imaging data stream, imaging separations based on an actual specified color for rendering thereof via a printer output device.

7. The method of claim 6 further comprising:
rendering colors of more than one hue on at least a single page utilizing said imaging data stream.

8. The method of claim 6 wherein said printer output device comprises a photocopy machine.

9. The method of claim 6 wherein said printer output device comprises a printer, which can communicate with a computer.

10. A system, comprising:
an imaging order module for configuring an imaging order associated with an imaging data stream for a plurality of objects to be rendered, wherein said imaging order determines color quality rendering thereof;
wherein text generated by said printer output device is rendered through said imaging data stream according to a pre-determined ink color;
wherein said imaging data stream generates imaging separations based on an actual specified color for rendering thereof via a printer output device; and
wherein said imaging order is applicable to said plurality of objects, including overlapping objects thereof, such that said imaging order comprises:
  (a) a plurality of fills called out in an imaging data stream form resource;
  (b) text and logo data called out in an imaging data stream form resource;
  (c) a plurality of image data called in an order in which such data appear and are called out from a variable data portion of said imaging data stream; and
  (d) a plurality of logos associated with said imaging data stream.

11. The system of claim 10 further comprising a full color-imaging model adaptable to said imaging data stream to provide an enhanced approximation of a user-intent point of view.

12. The system of claim 10 wherein a color having a plurality of hues is renderable on at least a single page.

13. The system of claim 10 wherein said printer output device comprises a photocopy machine.

14. The system of claim 10 wherein said printer output device comprises a printer, which can communicate with a computer.

15. The system of claim 10 wherein said imaging order module further comprises signal-bearing media.

16. The system of claim 15 wherein said signal-bearing media further comprises at least one of the following: transmission media and recordable media.

* * * * *